(12) United States Patent
Yang

(10) Patent No.: US 8,804,319 B2
(45) Date of Patent: Aug. 12, 2014

(54) FOLDING KEYBOARD

(75) Inventor: Xinchuan Yang, Jiaxingjingjikaifaqu Jiaxiang (CN)

(73) Assignee: Jiaxing Shunon Electronics Technology Co., Ltd., Jiaxingingjikaifaqu Jiaxiang (CN)

( * ) Notice: Subject to any disclaimer, the term of this patent is extended or adjusted under 35 U.S.C. 154(b) by 150 days.

(21) Appl. No.: 13/580,077

(22) PCT Filed: Aug. 22, 2011

(86) PCT No.: PCT/CN2011/078717
§ 371 (c)(1),
(2), (4) Date: Aug. 20, 2012

(87) PCT Pub. No.: WO2013/013432
PCT Pub. Date: Jan. 31, 2013

(65) Prior Publication Data
US 2013/0063883 A1    Mar. 14, 2013

(51) Int. Cl.
*G06F 1/16* (2006.01)
*B41J 11/56* (2006.01)
*G06F 3/02* (2006.01)
*H03K 17/94* (2006.01)

(52) U.S. Cl.
USPC .............. 361/679.15; 361/679.16; 400/680; 400/682; 345/168; 345/169; 341/22

(58) Field of Classification Search
USPC ............. 361/679.01–679.45, 679.55–679.59; 400/682, 82, 691–693, 680, 683; 345/168, 169, 905; 341/22
See application file for complete search history.

(56) References Cited

U.S. PATENT DOCUMENTS

| | | | | |
|---|---|---|---|---|
| 5,574,481 A | * | 11/1996 | Lee | 345/168 |
| 5,687,058 A | * | 11/1997 | Roylance | 361/679.14 |
| 6,714,403 B2 | * | 3/2004 | Furuki et al. | 361/679.09 |
| 6,798,649 B1 | * | 9/2004 | Olodort et al. | 361/679.13 |
| 6,992,657 B2 | * | 1/2006 | Huang et al. | 345/168 |
| 7,153,050 B2 | * | 12/2006 | Liu et al. | 400/682 |
| 2003/0002900 A1 | * | 1/2003 | Lin | 400/472 |
| 2004/0151527 A1 | * | 8/2004 | Sitalasai et al. | 400/472 |
| 2007/0008291 A1 | * | 1/2007 | Liu | 345/168 |

FOREIGN PATENT DOCUMENTS

EP    2610712 A1 *  9/2010

* cited by examiner

*Primary Examiner* — Nidhi Desai
(74) *Attorney, Agent, or Firm* — Buchanan Ingersoll & Rooney PC

(57) ABSTRACT

A folding keyboard has two parts which are hinged together and form the whole keyboard. An interlocking device which comprises a sliding block and a sliding vane is provided at the bottom surface of one part. One end of the sliding block is provided with a raised tongue which fits with a stopper provided inside the keyboard base. The sliding block is provided with a sliding rail and an inclined sliding groove provided along the sliding direction of the sliding vane, and a sliding axis arranged in the sliding groove is provided on the surface of the sliding vane. A fixing block is fixed at the bottom surface of one part and connected with a sliding rail block via an offsetting spring, and the sliding rail block is provided inside the sliding rail of the sliding block and slides in a direction perpendicular to that of the sliding vane.

5 Claims, 6 Drawing Sheets

FOLDING KEYBOARD

FIELD OF INVENTION

The utility model specifically relates to a computer folding keyboard, in particular to a folding keyboard whose two folding parts can be fixed together.

BACKGROUND OF INVENTION

Compared with the current electronic equipment, the traditional standard keyboards are too large and heavy, which are neither portable nor easy to use.

To solve the problem that the miniature full-character keyboards are unreasonable and inconvenient in operation when used in smart phones due to their too small keys in the keyboard market, a standard-sized folding keyboard came out in the market. The keyboard comprises two parts which can be folded when not in use, making the keyboard portable. In addition, with standard keys, the keyboard is also easy to use.

However, the keyboard needs to be placed at a even surface for use, otherwise it is inconvenient to use when put on legs or at an uneven surface. Besides, as the two parts of the keyboard can't be fixed together when being folded, they are easy to unfold when the keyboard falls on the ground, resulting in damage to the keyboard.

SUMMARY OF INVENTION

The utility model relates to a folding keyboard, which aims to provide a folding keyboard whose two parts can be fixed together when being folded and can freely unfold when being opened by solving the problems existing in the prior art.
Technical Proposal of the Utility Model:

A folding keyboard comprises part A and part B which are hinged together and form the whole keyboard, wherein, part A and part B are respectively provided with a guide rail groove at the lateral side, through which, part A and part B are embedded into the iron sheets of the guide rails at two lateral walls of a keyboard base. An interlocking device which comprises a sliding block and a sliding vane hinged at the bottom edge of part A is provided at the bottom surface of part A, wherein, one end of the said sliding block is provided with a raised tongue piece which fits with a stopper arranged inside the keyboard base; the sliding block is provided with a sliding rail and an inclined sliding groove arranged along the sliding direction of the sliding vane, and a sliding axis arranged in the sliding groove is provided on the surface of the sliding vane. In addition, the utility model also comprises a fixing block which is fixed at the bottom surface of part A and connected with a sliding rail block via an offsetting spring, and the sliding rail block is provided inside the sliding rail of the sliding block and slides in a direction perpendicular to that of the sliding vane.

A baffle arranged on an external axis where part B is hinged with part A is provided on the keyboard base, and a torsion spring sleeved on a rotating shaft is arranged between the shaft and the baffle.

Two magnets which fit each other are respectively arranged at the lateral ends of part A and part B.

Two magnets are arranged at the internal side of the keyboard base along different positions of the axial line of the keyboard, and a magnet which fits with the two magnets at the keyboard base is provided at the bottom surface of part B.

A sliding groove is provided on the bottom surface of part A, and the positioning screws arranged inside the sliding groove are fixed on the keyboard base.

The beneficial effects of the utility model are: the folding keyboard in accordance with the utility model is additionally arranged with an interlocking device for fixing the folded part A and part B, thus preventing the folding keyboard from damaging; part A and part B are respectively arranged with magnets, which strengthens the fixing of the folded two parts of the keyboard; a baffle is arranged at the position where the two parts of the keyboard are hinged together, which can prevent the fingers from being caught in the included angle formed between the unfolded part A and the keyboard base.

SPECIFIC EMBODIMENT

Figure 1:
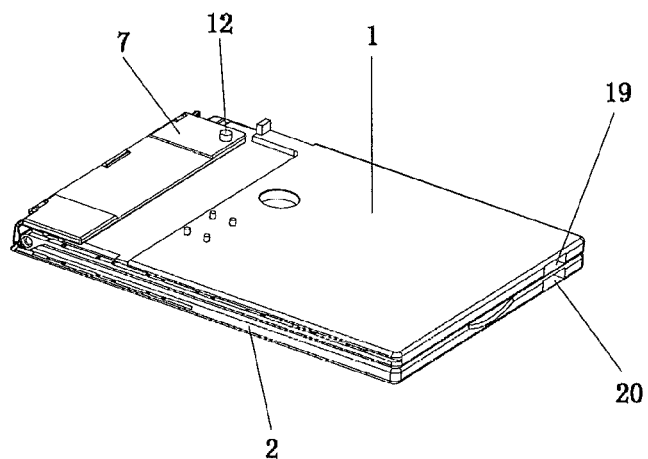
FIG. 1 is a schematic diagram of the folded utility model.
Figure 2:
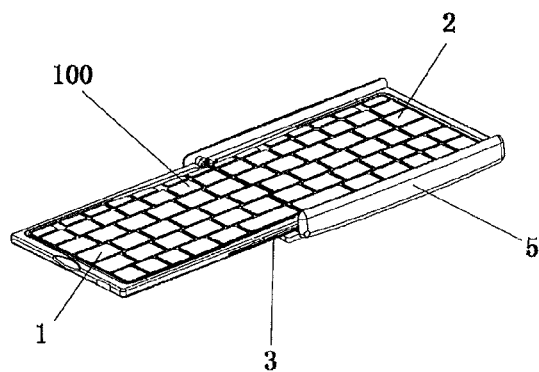
FIG. 2 is a schematic diagram of the unfolded utility model.
Figure 3:
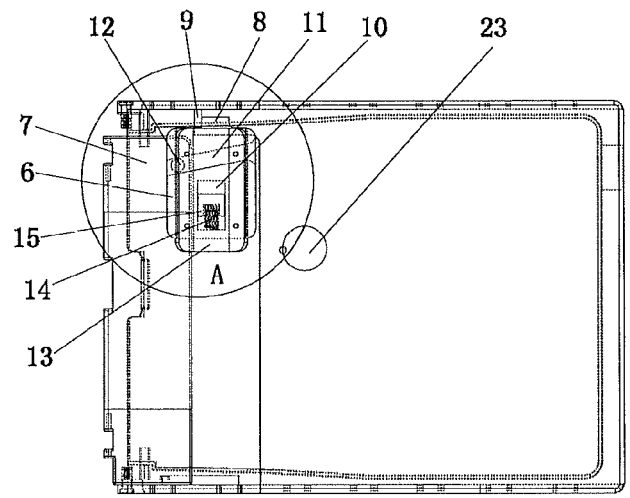
FIG. 3 is a schematic diagram of the interlocking device.
Figure 4:
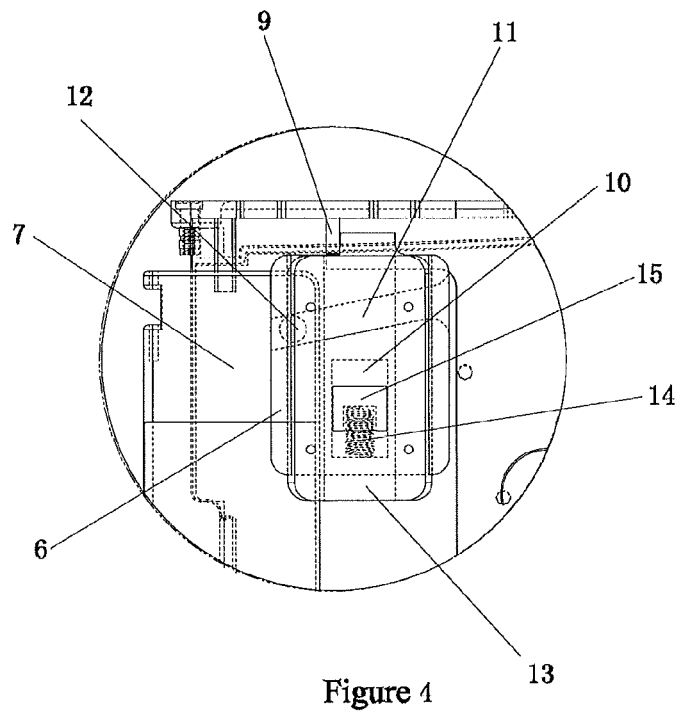
FIG. 4 is an enlarged view of part A shown in FIG. 3.
Figure 5:
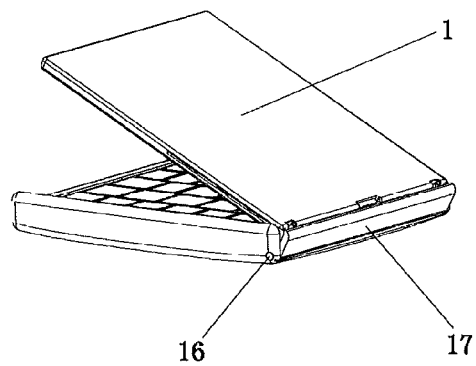
FIG. 5 is a schematic diagram for connection between the baffle and the keyboard base.
Figure 6:
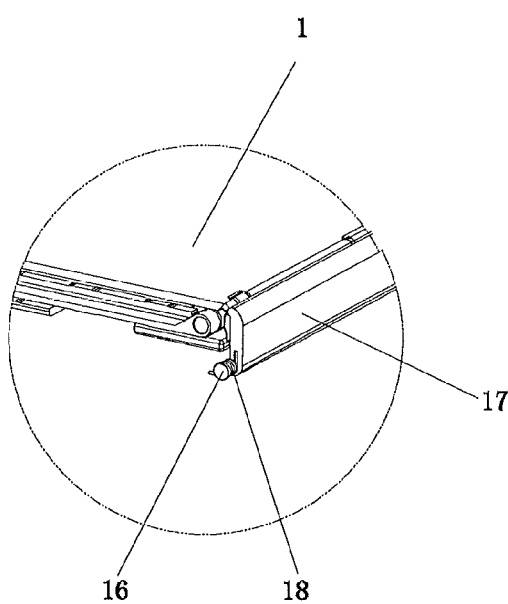
FIG. 6 is a partial diagram for connection between the baffle and the keyboard base.
Figure 7:
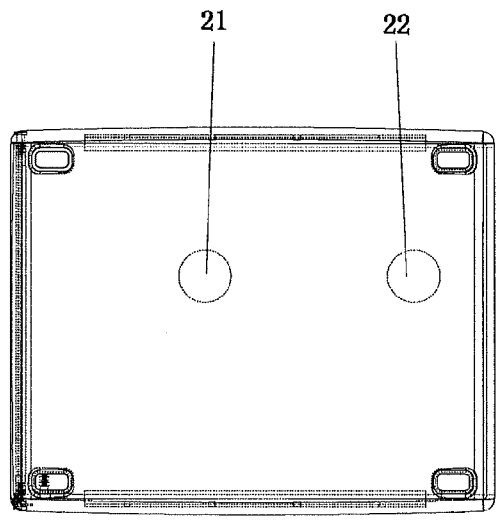
FIG. 7 is an arrangement diagram of the magnets on the keyboard base.
Figure 8:
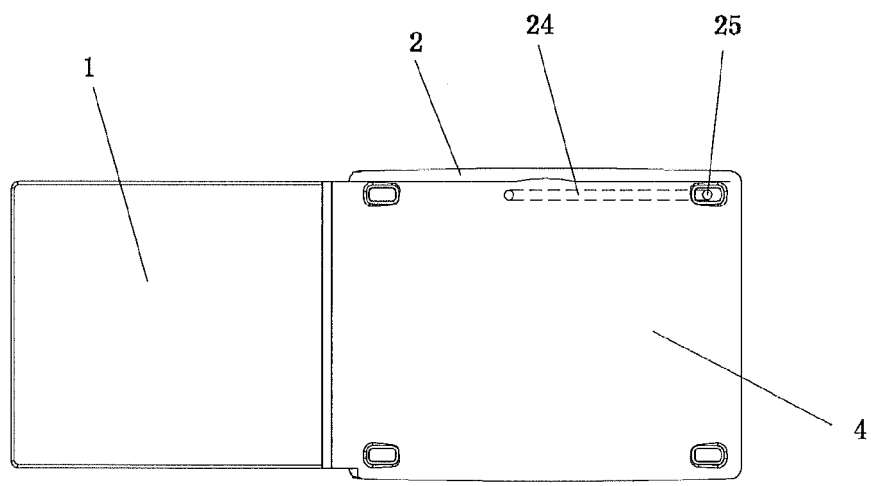
FIG. 8 is a schematic diagram for connection between the keyboard base and part B.

Referring now to the accompanying drawings and the specific embodiments, the utility model is further described as follows.

According to FIG. 1-8, the folding keyboard comprises part A 1 and part B 2 which are hinged together and form the whole keyboard 100, wherein, part A 1 and part B 2 are respectively arranged with a guide rail groove 3 at the lateral side, through which, part A 1 and part B 2 are embedded into the iron sheets 5 of the guide rails at two lateral walls of a keyboard base 4. An interlocking device which comprises a sliding block 6 and a sliding vane 7 hinged at the bottom edge of part A 1 is arranged at the bottom surface of part A 1, wherein, one end of the sliding block 6 is arranged with a raised tongue piece 8 which fits with a stopper 9 arranged inside the keyboard base 4; the lower surface of sliding block 6 is arranged with a sliding rail 10 and a sliding groove 11 arranged along the sliding direction of the sliding vane 7, and an inclined angle is arranged between the sliding groove 11 and the axial line of the sliding vane 7; a sliding axis 12 arranged in the sliding groove 11 is provided on the upper surface of the sliding vane 7. In addition, the utility model also comprises a fixing block 13 which is fixed at the bottom surface of part A 1 and connected with a sliding rail block 15 via an offsetting spring 14 and the sliding rail block 15 is arranged inside the sliding rail 10 of the sliding block 6 and slides in a direction perpendicular to that of the sliding vane 7. The size of the inclined angle is designed in such a manner that when the sliding axis 12 slides from one end of the sliding groove 11 to the other end, the tongue piece 8 on the sliding block 6 can be separated from the stopper 9, that is, the tongue piece 8 will not be clamped by the stopper 9 any longer. In addition, the sliding axis 12 may also be arranged at the lower surface of the sliding vane 7, in which case the sliding groove 11 is required to be arranged at the upper surface of the sliding block 6, and the sliding rail 10 may also be a through groove or arranged at the upper surface of the sliding block 6. When the position of any of the sliding groove 11, the sliding axis 12 and the sliding rail 10 is changed, the position of corresponding parts is required to be changed accordingly to ensure the interlocking device can function normally.

To prevent the fingers from being caught in the included angle formed between the unfolded part A 1 and the keyboard base 4, a baffle 17 arranged on an external axis where part B 2 is hinged with part A 1 is provided on the keyboard base 4, and a torsion spring 18 sleeved on a rotating shaft 16 is arranged between the shaft 16 and the baffle 17. The baffle 17 will cover the gap between part A 1 and part B 2 after the keyboard is folded, and will always closely fit to the gap under the action of the torsion spring 18, making the keyboard aesthetic in appearance. When part A 1 rotates in the unfolding process, it will closely fit to and press against the baffle 17 to overcome the force of the torsion spring 18. In this way, it may prevent the fingers from being caught in the included angle formed between the unfolded part A 1 and the keyboard base 4.

A magnet 19 is arranged at the lateral end of part A 1, and a magnet 20 which fits with the magnet 19 is arranged at the lateral end of part B 2. After the keyboard is folded, the magnet 19 on part A 1 and the magnet 20 on part B 2 will be attracted, which may avoid the keyboard from being unfolded in case of accidents, thus reducing the damage to the keyboard.

Two magnets 21 and 22 are arranged at the internal side of the keyboard base 4 along different positions of the axial line of the keyboard, and a magnet 23 which fits with the two magnets 21 and 22 at the keyboard base 4 is arranged at the bottom surface of part A 1. When part A 1 is unfolded and kept flat, the keyboard 100 will slide. During the sliding process, the keyboard 100 will overcome the magnetic attraction between the magnet 21 and the magnet 23 first, and then continue to slide until the magnet 22 and the magnet 23 are attracted each other, thus making the whole keyboard 100 fixed.

The aim of magnet 21 provided is to ensure a similar force for pushing and pulling the keyboard. The magnet 23 may also be arranged at part B.

To avoid part B 2 from sliding off the keyboard base 4, a sliding groove 24 is arranged at the bottom surface of part B 2, and positioning screws 25 arranged inside the sliding groove 24 are fixed on the keyboard base 4. In fact, a sliding groove may also be arranged at the keyboard base 4, and positioning screws may be arranged at the base of part B 2, or a sliding groove or positioning screws may be arranged on part A 1. The foresaid structure may be changed according to the production requirements.

Figure 9:
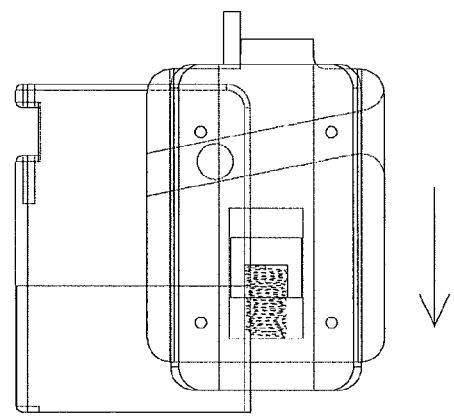
FIG. 9 is a schematic diagram I of the opened interlocking device.
Figure 10:
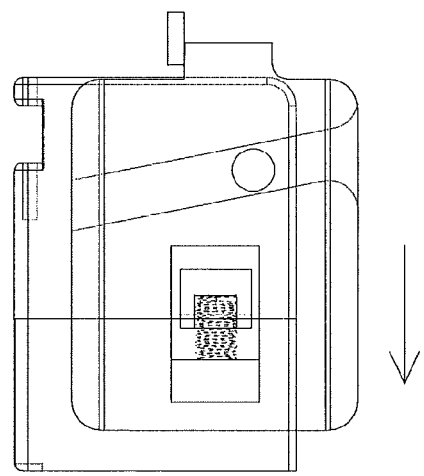
FIG. 10 is a schematic diagram II of the opened interlocking device.
Figure 11:
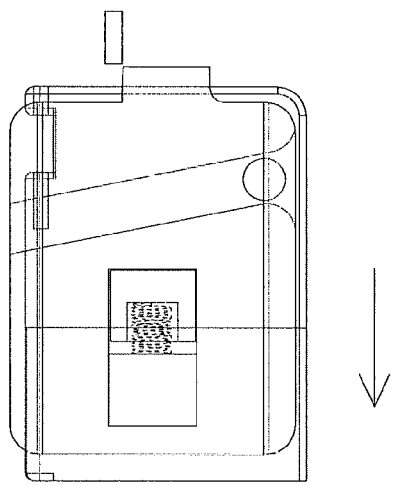
FIG. 11 is a schematic diagram III of the opened interlocking device;
Wherein: 100. Keyboard; 1. Part A; 2. Part B; 3. Guide rail groove; 4. Keyboard base; 5. Iron sheet of guide rail; 6. Sliding block; 7. Sliding vane; 8. Tongue piece; 9. Stopper; 10. Sliding rail; 11. Sliding groove; 12. Sliding axis; 13. Fixing block; 14. Offsetting spring; 15. Sliding rail block; 16. Rotating Shaft; 17. Baffle; 18. Torsion spring; 19. Magnet; 20. Magnet; 21. Magnet; 22. Magnet; 23. Magnet; 24. Sliding groove; 25. Positioning screw

When the keyboard 100 is folded, the stopper on the keyboard base 4 will clamp the tongue piece 8 of the sliding block on the base of part A 1, thus locking part A 1 and part B 2 together; meanwhile, the magnet 19 on the end face of part A 1 and the magnet 20 on the end face of part B 2 are attracted together. When being unfolded, part A 1 will overcome the magnetic attraction between the magnet 19 and 20 first, and then the unfolded part A 1 will turn over and then keep flat. In the turning process, as shown in FIGS. 9, 10 and 11, the sliding vane 7 slides towards the internal side of part A 1 along the axial line, and the sliding axis 12 also slides in the sliding groove 11 accordingly. As the sliding groove 11 is inclined, when the sliding axis 12 slides along the sliding groove 11, the sliding block 6 moves downwards along the direction perpendicular to the sliding direction of the sliding vane 7. The sliding block 6 moves downwards following the sliding rail block 15 along the sliding rail 10. After the internal side of the sliding block 6 contacts with the sliding rail block 15, the sliding block 6 will press against the sliding rail block 15 and continuously move downwards, and the sliding rail block will compress the offsetting spring 14 while being pressed downwards by the sliding block 6. The downward-moving sliding block 6 will drive the tongue piece 8 to move downwards, and when part A 1 rotates to a certain position, the tongue piece 8 will separate from the stopper 9, making part A 1 separated from part B 2. Furthermore, in the rotating process, part A 1 will make the baffle 17 rotate by 90 degrees via the axis to make it in parallel with the keyboard base 4. After being kept flat, part A 1 will slide along the iron sheets 5 of the guild rail via the guide rail groove 3 to the position of the magnet 22 on the keyboard base 4, in which case, the magnet 22 and 23 will be attracted each other, thus making the whole keyboard 100 fixed.

Part A 1 and part B 2 may be folded by reversing the aforesaid operation procedure.

Part A 1 needs to overcome the magnetic attraction between the magnet 22 and 23 and between the magnet 21 and 23 to slide off the keyboard base 4 in order to make it folded. In the folding process, the sliding block 6 will return to the original position under the compression force of the offsetting spring 14, to make the tongue piece 8 clamped with the stopper 9, under which part A 1 and part B 2 will be interlocked together.

The folding keyboard is additionally arranged with an interlocking device for fixing the folded part A 1 and part B 2, thus preventing the folding keyboard from damaging. Furthermore, part A 1 and part B 2 are respectively arranged with magnet 19 and 20, which strengthens the fixing of the folded two parts of the keyboard; and a baffle 17 is arranged at the position where the two parts of the keyboard are hinged together, which can prevent the fingers from being caught in the included angle formed between the unfolded part A 1 and the keyboard base 4.

The invention claimed is:

1. A folding keyboard, comprising a part A and a part B which are hinged together and form the whole keyboard, wherein the part A and the part B are respectively provided with a guide rail groove at a lateral side, through which, the part A and the part B are embedded into iron sheets of guide rails at two lateral walls of a keyboard base, and an interlocking device which comprises a sliding block and a sliding vane hinged at a bottom edge of the part A, wherein, one end of said sliding block is provided with a raised tongue piece which fits with a stopper provided inside the keyboard base; the sliding block is provided with a sliding rail and an inclined sliding groove provided along a sliding direction of the sliding vane, and a sliding axis arranged in the sliding groove is provided on a lower surface of the sliding vane, and a fixing block is fixed at a bottom surface of the part A and connected with a sliding rail block via an offsetting spring, wherein the sliding rail block is provided inside the sliding rail of the sliding block and slides in a direction perpendicular to that of the sliding vane.

2. The folding keyboard as claimed in claim 1, wherein a baffle arranged on an external axis where the part B is hinged with the part A is provided on the keyboard base, and a torsion spring sleeved on a revolving shaft is arranged between the revolving shaft and the baffle.

3. The folding keyboard as claimed in claim 1, wherein magnets which fit each other are respectively provided at lateral ends of the part A and the part B.

4. The folding keyboard as claimed in claim 1, wherein magnets are provided at an internal side of the keyboard base along different positions of an axial line of the keyboard, and a magnet which fits with the magnets at the keyboard base is provided at the bottom surface of the part A.

5. The folding keyboard as claimed in claim 1, wherein a second sliding groove is provided on a bottom surface of the part B, and positioning screws provided inside the second sliding groove are fixed on the keyboard base.

* * * * *